US006238122B1

(12) United States Patent
Brooks et al.

(10) Patent No.: US 6,238,122 B1
(45) Date of Patent: May 29, 2001

(54) DISPLAY DEVICE AND METHOD THEREFOR

(75) Inventors: Craig L. Brooks, Dallas; Mark A. Mosley, Richardson, both of TX (US)

(73) Assignee: Exhaust Etiquette, Richardson, TX (US)

( * ) Notice: Subject to any disclaimer, the term of this patent is extended or adjusted under 35 U.S.C. 154(b) by 0 days.

(21) Appl. No.: 09/260,426

(22) Filed: Mar. 1, 1999

(51) Int. Cl.[7] .............................. F16B 11/12; F16D 1/00; F16D 3/00

(52) U.S. Cl. .............................................. 403/24; 403/374.3

(58) Field of Search .............................. 40/591, 588, 589, 40/665, 643, 494, 910–912; 403/347, 374.3, 379.3, 24

(56) References Cited

U.S. PATENT DOCUMENTS

| | | | | |
|---|---|---|---|---|
| 1,440,061 | * | 12/1922 | Connolly | 224/277 |
| 1,496,266 | * | 6/1924 | Groth | 40/665 |
| 1,576,028 | * | 3/1926 | Bowen | 40/506 |
| 1,614,792 | * | 1/1927 | Joiner | 40/588 |
| 1,629,291 | * | 5/1927 | Muscate | 40/643 |
| 1,733,293 | * | 10/1929 | Brow | 40/643 |
| 1,796,243 | * | 3/1931 | Coughlin | 24/484 |
| 1,861,130 | * | 5/1932 | Mitchel | 40/665 |
| 1,969,925 | * | 8/1934 | Cobbs | 40/10 |
| 2,203,155 | * | 6/1940 | Jullien et al. | 40/665 |
| 3,006,092 | * | 10/1961 | Sternberg | 40/632 |
| 3,015,177 | * | 1/1962 | Hembd et al. | 40/665 |
| 3,785,337 | * | 1/1974 | Flowerday | 116/209 |
| 4,456,883 | * | 6/1984 | Bullis et al. | 324/464 |
| 4,510,555 | * | 4/1985 | Mori | 362/32 |
| 4,761,904 | * | 8/1988 | Fast et al. | 40/308 |
| 4,782,613 | * | 11/1988 | Guiler et al. | 40/316 |
| 5,056,822 | * | 10/1991 | Shim | 281/44 |
| 5,450,058 | * | 9/1995 | Collier | 340/473 |
| 5,479,735 | * | 1/1996 | Martin, Jr. | 40/593 |
| 5,533,289 | * | 7/1996 | Hoffman | 40/544 |

* cited by examiner

*Primary Examiner*—Lynne H. Browne
*Assistant Examiner*—John B. Walsh
(74) *Attorney, Agent, or Firm*—Sandra L. Godsey

(57) ABSTRACT

A method and apparatus for display, having a tailpipe attachment piece, adapted for coupling to the exhaust pipe of a vehicle, a receiver piece coupled to the tailpipe attachment piece, wherein the receiver piece is adapted for coupling to a display piece. In one embodiment, a pollution detection device includes a tailpipe attachment piece, a receiver piece coupled to the tailpipe attachment piece, and a chemical indicator coupled to the receiver piece, wherein the chemical indicator is sensitive to the chemistry of emissions. In one embodiment, a method of presenting an advertisement message is provided by attaching the message to the exhaust pipe.

4 Claims, 8 Drawing Sheets

DISPLAY DEVICE AND METHOD THEREFOR

FIELD OF THE INVENTION

The present invention relates to display devices and specifically to automotive display devices.

BACKGROUND OF THE INVENTION

Automobile displays are often used to express feelings, alliances, political preferences, and to support sports teams, local organizations, as well as any number of expressions. Traditional methods of display include bumper stickers, license plate frames, suction cup displays, antenna flags, rear view mirror ornaments, hood ornaments, and many others. Each of these methods of expression has drawbacks.

Bumper stickers, decals, and other stickers require adhesive that is difficult to remove without damaging the paint on the car. Bumper stickers are effectively a permanent expression pasted to the car for as long as you own the car. As time goes by, the bumper sticker ages and eventually may become illegible, while the remnants of the bumper sticker remain visible. Bumper stickers are not easily changed, as either a new one must be placed exactly over the old one, or one must scrape the old one off prior to placing the new one.

The license plate frames have a very limited space for text or graphic display and are usually only visible from immediately in front of the license plate. These are difficult to change, usually requiring several screws and are not easily removed. When the license plate frame is larger, it often impairs the visibility of the license plate itself.

The suction cup displays, often seen to warn that children are "on board," are themselves hazardous as they block a portion of the driver's view. In fact, these are typically placed in the critical "blind spot" area of the car, near to the rear corner of the car. Similarly, rear view mirror ornaments, hood ornaments and antenna flags may interfere with the driver's visibility. The external methods of display are particularly precarious, as they may be destroyed by the elements or blown off by the high velocity winds during operation of the automobile.

For displaying personal, safety or any other information using an automobile, or other vehicle, it is desirable to have a nonintrusive method of display, which is easily removed or changed, is easy to install, does not impair visibility, and draws attention to the display.

BRIEF DESCRIPTION OF THE DRAWINGS

The present invention may be more fully understood by a description of certain preferred embodiments in conjunction with the attached drawings in which.

DETAILED DESCRIPTION OF A PREFERRED EMBODIMENT

Figure 1:
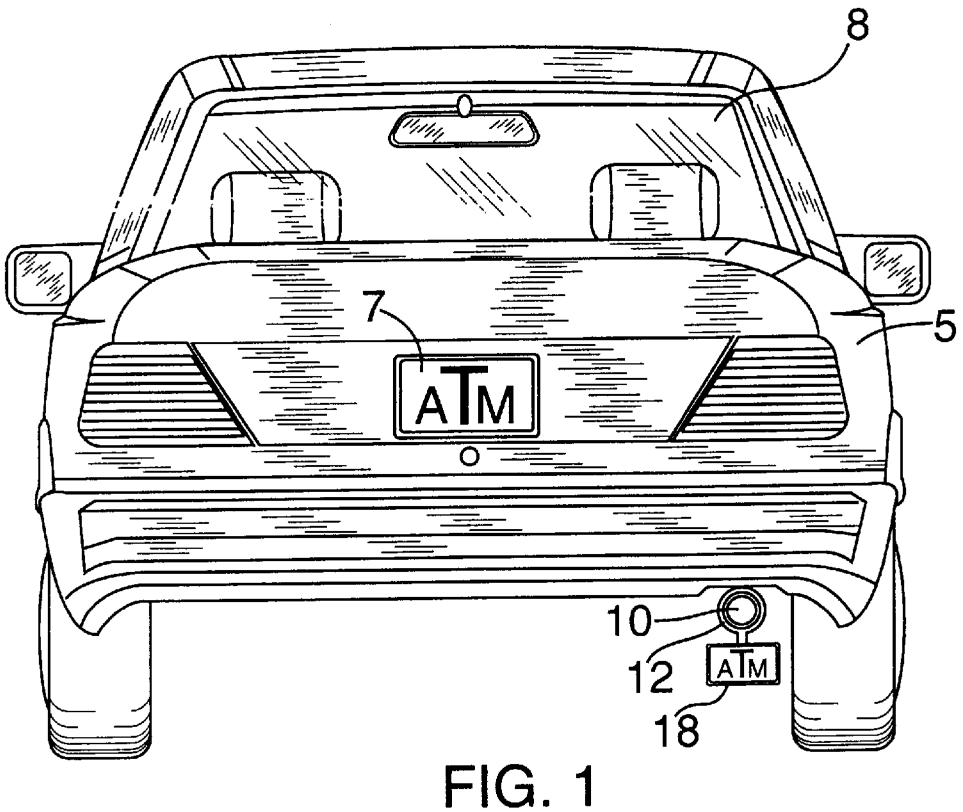
FIG. 1 illustrates a display device on an vehicle, according to one embodiment of the present invention.

The present invention provides a flexible, convenient means for displaying a display article from the exhaust pipe, or tail pipe of a vehicle. According to one embodiment, a display device is attached to the tailpipe of a vehicle, having a display article. According to one embodiment, the display article may be changed by disconnecting the display article from the display device and attaching another display article.

According to one aspect of the present invention, a display apparatus including a tailpipe attachment piece, adapted for coupling to the exhaust pipe of a vehicle, and a receiver piece coupled to the tailpipe attachment piece, wherein the receiver piece is adapted for coupling to a display piece.

According to another aspect of the present invention, a display piece, includes a display portion for displaying information, and a coupling piece coupled to the display portion and adapted for coupling to an exhaust pipe of a vehicle.

According to still another aspect of the present invention, a method for display includes the steps of attaching a tailpipe attachment piece to the exhaust pipe of a vehicle, the tailpipe attachment piece having a receiver piece, and attaching a display piece to the receiver piece.

According to one aspect of the present invention, a hinge includes a first portion having a first interface portion, a second portion having a second interface portion, wherein the second interface portion is adapted to interface with the first interface portion, the second interface portion and the first interface portion adapted to couple the first portion to the second portion, the second portion having a flange which interacts with the first portion so as to allow freedom of rotation in a first direction with respect to the first portion, and limit rotation in a reverse direction with respect to the first portion, and an interface piece adapted to secure the first and second portions when the first and second interface portions are coupled.

According to one embodiment of the present invention, a pollution detection device includes a tailpipe attachment piece, adapted for coupling to the exhaust pipe of a vehicle, a receiver piece coupled to the tailpipe attachment piece, and a chemical indicator coupled to the receiver piece, wherein the chemical indicator is sensitive to the chemistry of emissions. The detection device could determine an oxygen ratio in the emissions, or carbon monoxide or nitrogen oxides, or any other chemical. It is also possible to detect.

Additionally, it is possible to monitor the temperature of the exhaust emissions from the display device, providing a warning to the operator of potential problems with the catalytic converter or other problems in the emissions system. This is particularly desirable where the vehicle is driven through grass, or other flammable materials. Further, vibrational detectors may be placed within proximity of the tailpipe to allow detection of potential problems with the muffler or exhaust system. The indication may be a color change in the display article, such as a dot in the upper comer. Further the signal may be provided as feedback to the operator of the vehicle or technician working on the vehicle.

One embodiment of the present invention is the Exhaust Etiquette, TailRings device, having an adjustable engagement ring, a hinge which restricts rotation in one direction and has replaceable display articles.

Figure 2:
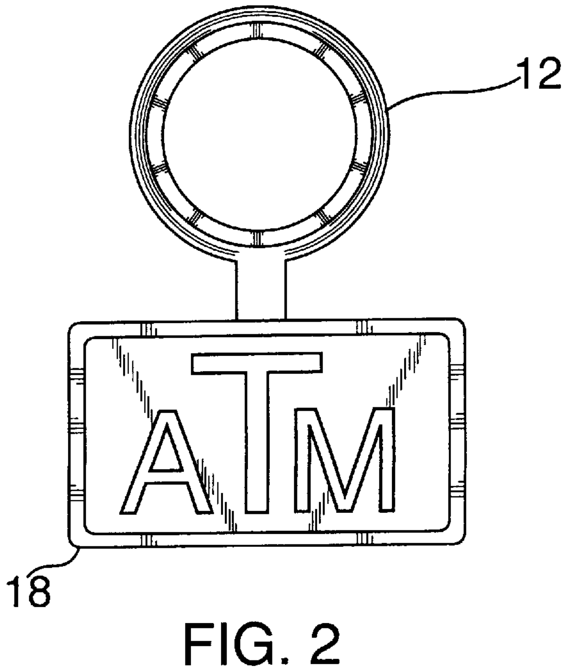
FIGS. 2–3 illustrate a display device according to one embodiment of the present invention.

As illustrated in FIG. 1, display device 12 is attached to vehicle 5 and is positioned around tailpipe 10. Display device 12 includes a display article 18, which allows display of information, insignia, college name, logo, etc. The display article 18 does not interfere with view of the license plate 7 and does not obstruct the view from any windows in the vehicle 5, such as through window 8. The display device 12 of FIG. 1 is further illustrated in FIG. 2, including display article 18.

Many of the benefits of the present invention are illustrated in FIG. 1, where the display article is positioned under the vehicle and is thus protected from the elements, such as rain, sleet, dust, wind, etc. The vehicle acts as an umbrella over the display article. Similarly, the display article is below the exhaust pipe, and therefore is not in the path of exhaust gases. Additionally, the display article is easily visible from behind the vehicle, allowing full expression. The display article does not interfere with the view of the vehicle operator, and is not intrusive to operation of the vehicle.

The position of the display device is particularly applicable to sensors and safety type devices, which provide information about the rear of the vehicle. The display device provides a convenient place to warn other drivers, such as that children are in the vehicle.

Figure 3:
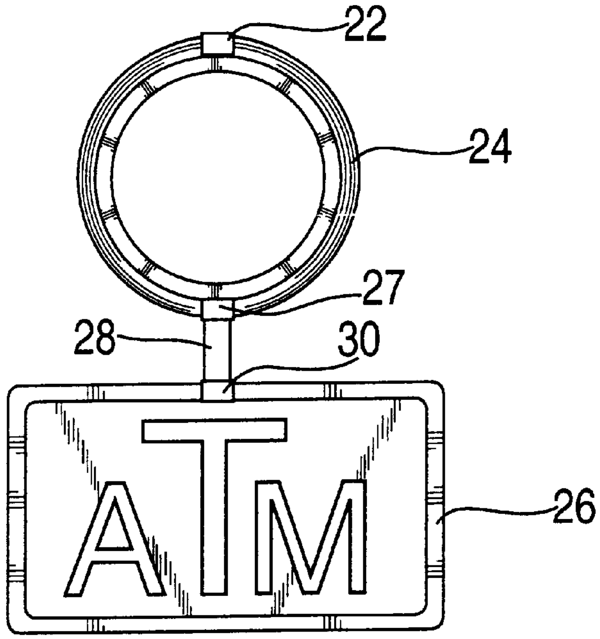

FIG. 3 illustrates one embodiment of display device 12, including an engagement ring 24, which has a round shape adapted to accommodate an exhaust pipe or tailpipe of a vehicle. Display device 12 further includes a latch 22 for positioning the display device 12 on the tailpipe, for removing the display device 12 from the tailpipe, and positioning and securing the display device 12 on the tailpipe. Latch 22 may be a mechanical locking device for securing the two sides of engagement means 24, or may be a slide connector, or any other device which secures the engagement ring 24 to a size sufficient to hold to the tailpipe. Engagement ring 24 is also coupled to connectors 27, 28, and 30. Connector 30 is then coupled to the display article 26. According to one embodiment, connector 27 is fixedly attached to the engagement ring 24, while connector 28 is easily removed or inserted into both connector 27 and connector 30. When connector 28 is removed, connector 27 is decoupled from connector 30, and engagement ring 24 from display article 26.

Engagement ring 24 will typically fit snuggly to the tailpipe so that the display device 12 remains attached to the tailpipe, and so that the display article 26 may be read accurately. Note that alternate embodiments may have engagement rings that slide around the tailpipe, effecting a visual, dynamic display. This is the case of children's animals, spiral shapes, etc., where the display article moves either back and forth or around the tailpipe. In one embodiment, two children are on a see-saw, and move back and forth with the movement of the vehicle. In another embodiment, a spherical pattern is formed as the display article rotates around the tailpipe.

Figure 4:
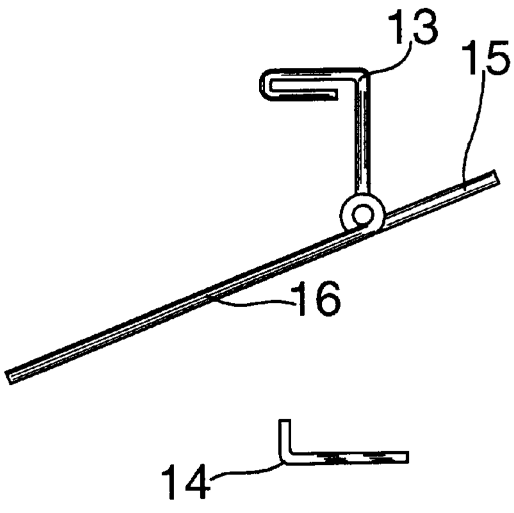
FIGS. 4–6 illustrate portions of a display device according to one embodiment of the present invention.

FIG. 4 illustrates portions of display device 12, where connector 16 has an protruding portion 15. Connector 13 is typically fixedly attached to an engagement rung, such as ring 24. Connector 13 is adapted to couple to connector 16, and pin 14 is adapted to secure this coupling. When connector 13 is coupled to connector 16 and secured by pin 14, the combination acts as a hinge. Such a hinge operation restrains movement in one rotational direction, illustrated in FIG. 4 as counterclockwise direction. As the display article hangs from the tailpipe, it is desirable to prevent the display article from rotating outward, away from the vehicle to maintain a readable display. Further, according to one embodiment, illustrated in FIG. 4, the display article is allowed to rotate toward the vehicle to allow for accidental contact with other objects. This is the case if the vehicle reverses into an obstacle, or it hit by another vehicle or object. Considering connector 13 stationary with respect to an engagement ring, connector 16 rotates counterclockwise until protruding portion 15 meets connector 13, thus prohibiting further movement.

Figure 5:
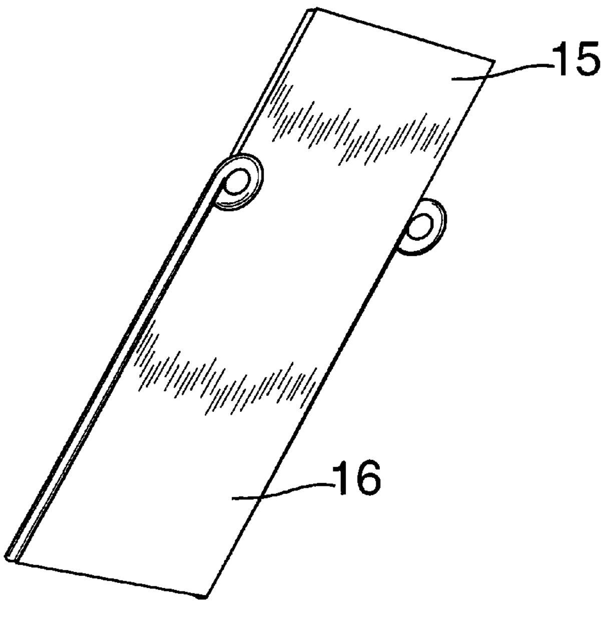
Figure 6:
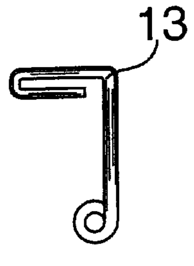

As illustrated in FIGS. 4 and 5, connector 16 has two rounded portions which form a longitudinal hole. The two rounded portions of connector 16 mate with the single rounded portion of connector 13, illustrated in FIG. 6. According to this embodiment, the protruding portion 15 of connector 16 is located between the two rounded portions. Alternate embodiments may have only one rounded portion, or may have multiple rounded portions, and/or multiple protruding portions. Still alternate embodiments may employ alternate shapes, such as square, or rectangular, or octagonal, which allow incremental rotations. Some embodiments may not allow movement, and only provide joint operation of the combination of connector 16 and connector 13. Note that alternate embodiments may employ other means of coupling the engagement ring to the display article which employ a one piece unit. As illustrated in FIG. 6, connector 13 is adapted for coupling to the engagement ring. A one piece unit may be implemented in the tailpipe or within the muffler, wherein the display device or a portion of the display device is formed molded or otherwise constructed as a part of the tailpipe and/or muffler. For example, the display device may be molded into the tailpipe and/or muffler during manufacture of the tailpipe and/or muffler.

The display device may therefore be an integral part of the tailpipe and/or muffler, and may include the display article.

Figure 7:
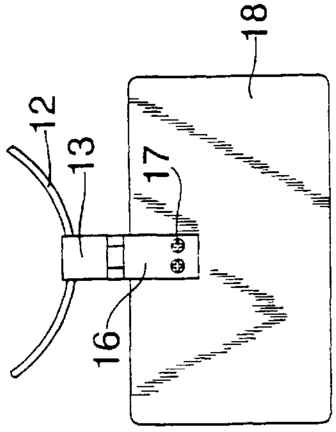
FIGS. 7–8 illustrate portions of a display device according to one embodiment of the present invention.
Figure 8:
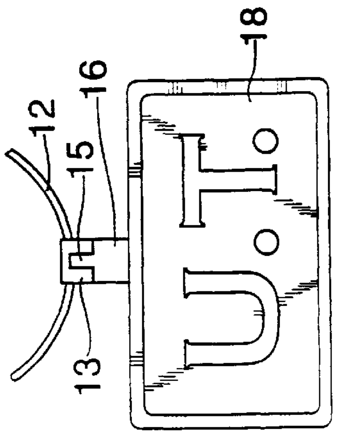

Two views of the display device attached to a vehicle are provided in FIGS. 7 and 8, where FIG. 7 is a back view, and FIG. 8 is a front view. Note that the front view of FIG. 8 is observed from behind the vehicle, while view FIG. 7 is not readily available from behind the vehicle. As illustrated in FIG. 7, display article 18 is attached to connector 16 via screws 17, but may be any attachment means, including an adhesive element, interlocking tape, a magnetic element, or any other means of coupling display article 18 to connector 16. Note that display article 18 is coupled to connector 16 which is mated with connector 13, and connector 13 is coupled to engagement ring 12. In this way, the display article may rotate toward the viewer. FIG. 8 illustrates the front view as seen from behind the vehicle, where a university insignia is displayed from the display article 18. While screws 17 are not shown in FIG. 8, they may be visible. Here the protruding portion 15 of connector 16 is lying flat against connector 13.

Figure 9:
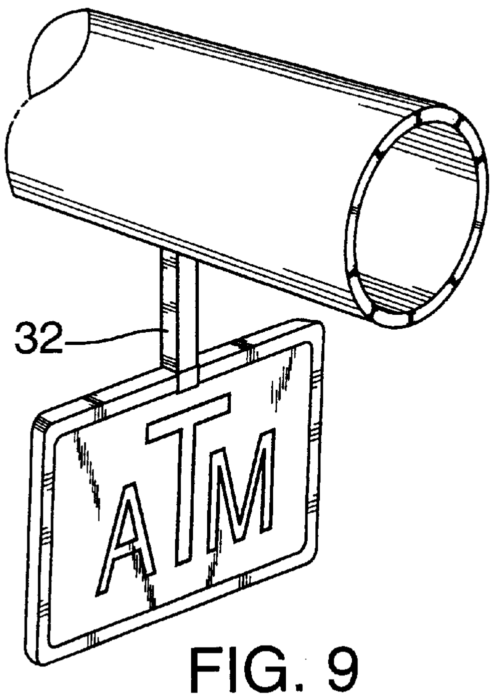
FIG. 9 illustrates a tailpipe according to one embodiment of the present invention.

FIG. 9 illustrates a display device incorporated into a tailpipe. Here a connector 32 couples the tailpipe to the display article. Note that the connector may be a single piece with the tailpipe, or may a separate piece fixedly attached to the tailpipe, or may be detachable and/replaceable from the tailpipe. In one embodiment, the display device may be a one-piece unit without distinguishing parts. According to one embodiment, the display article is detachable and replaceable. According to an alternate embodiment, the display device and display article are one unit and are not separable.

Figure 10:
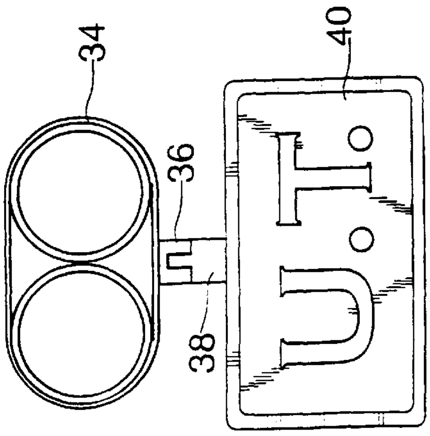
FIG. 10 illustrates a display device according to one embodiment of the present invention.
Figure 11:
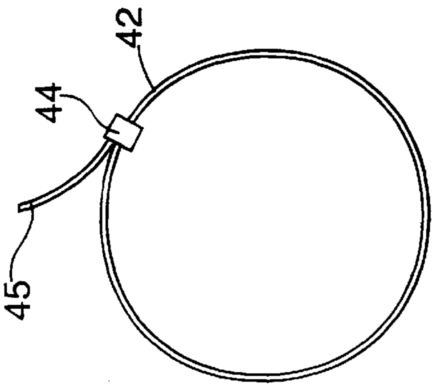
FIG. 11 illustrates a portion of an engagement means according to one embodiment of the present invention.

The display device of one embodiment adapts to fit a variety of tailpipe sizes, shapes, and configurations. As illustrated in FIG. 10, engagement ring 34 is fits around a double tailpipe. Engagement ring 34 is coupled to connectors 36 and 38, which couple display article 40 and engagement ring 34. Note that the engagement ring 34 may be an adjustable ring or may be custom sized to adapt to a particular size tailpipe, tailpipe configuration, make and model of car, etc.

An adjustable engagement ring 42 is illustrated in FIG. 42, where a clip 44 adjusts the ring 42 to accommodate a tailpipe. Note that the excess section 45 may be eliminated from the ring 42. Ring 42 may be a durable plastic, such a thermal resist material, or may be a rubber, a metal, or may be a stretch resistant material, such as timing belt materials, etc. It is desirable that the material resist melting, resist heat deformity, resist stretching, resist cracking, etc. It is further desirable that the material be a non-skid type material to prevent sliding off the tailpipe.

In one embodiment, the present invention employs a molded plastic engagement means with a zip tie cord, which locks when inserted. According to another embodiment, a snap closing forms a watch band clasp type of connection, and may be made of molded plastic, leather, flexible mesh metal, ribbon, rubber, nylon, neoprene or reinforced rubber, tin, copper, brass, ceramics, interlocking tape or other material. The present invention may be implemented using a heat resistant rubber, or a nonheat resistant rubber, as the tailpipe of most cars does not experience great temperature variations. Similarly, the present invention may be implemented with, or contain pieces or components implemented with, a durable plastic or molded plastic bands. Note that according to one embodiment, a stainless steel band is provided with a clasp type closure. According to still another embodiment, an aluminum or chrome engagement mechanism is provided having a watch clasp type closure.

Figure 12:
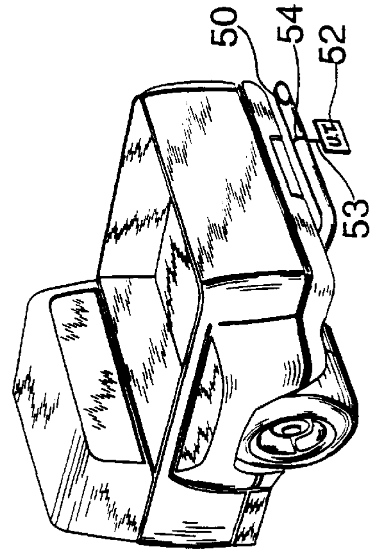
FIGS. 12–14 illustrate display devices on vehicles according to one embodiment of the present invention.
Figure 13:
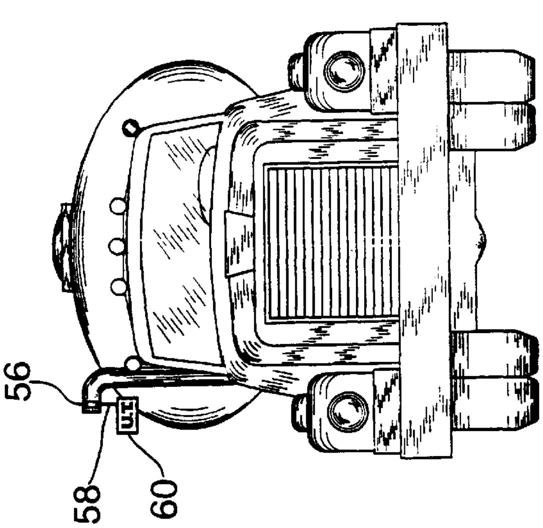

A truck is illustrated in FIG. 12, having a tailpipe 50 that extends parallel to the back of the truck bed. Engagement ring 52 is adjusted for the size and shape of such a tailpipe, and attachment piece 53 allows the display article 52 to hang visibly from the truck. Attachment piece 53 includes an adjustment, which allows the display article 52 to be so positioned. Similarly, in FIG. 13, a transport vehicle is illustrated having an exhaust pipe next to the cab portion of the vehicle. An engagement ring 56 is adapted to the increased size and distinct shape of the exhaust pipe. Again an attachment piece 58 allows the display article 60 to hang visibly. Here the attachment piece 58 may allow rotation of the display article, and may include an adjustment for determining which way display article 60 will be viewed. Still further, display article 60 may be double sided, allowing views from in front and behind the exhaust pipe.

Figure 14:
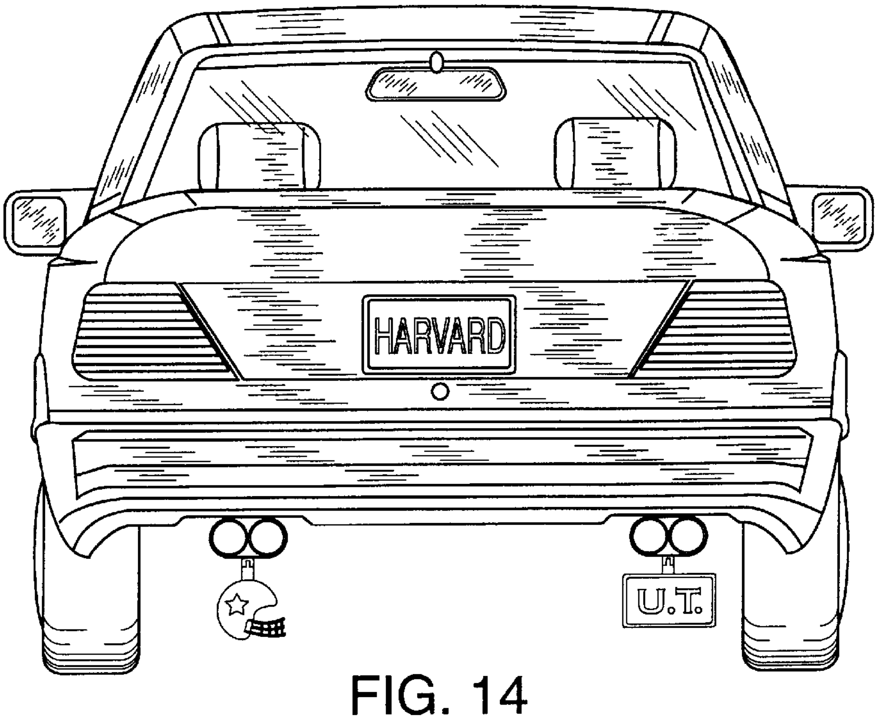

FIG. 14 illustrates a vehicle having two display devices attached to two sets of double tailpipes. Note that display articles may any of a variety of shapes, and sizes. Similarly, display articles may be made of a variety of materials, including metal, such as used for license plates, plastic, resin, cardboard, aluminum, stainless steel, gold, silver, plated material, etc.

Figure 15:
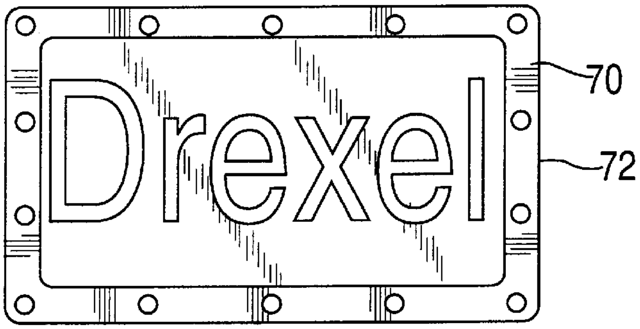
FIGS. 15–17 illustrate a lighted display device according to one embodiment of the present invention.
Figure 16:
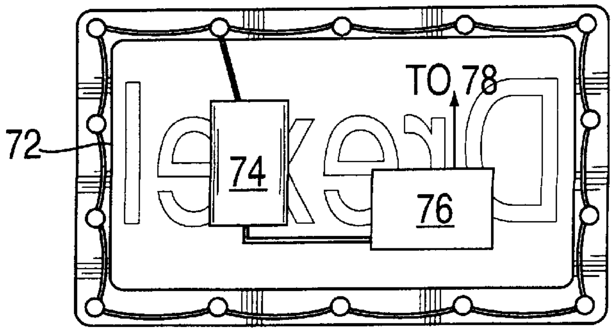
Figure 17:
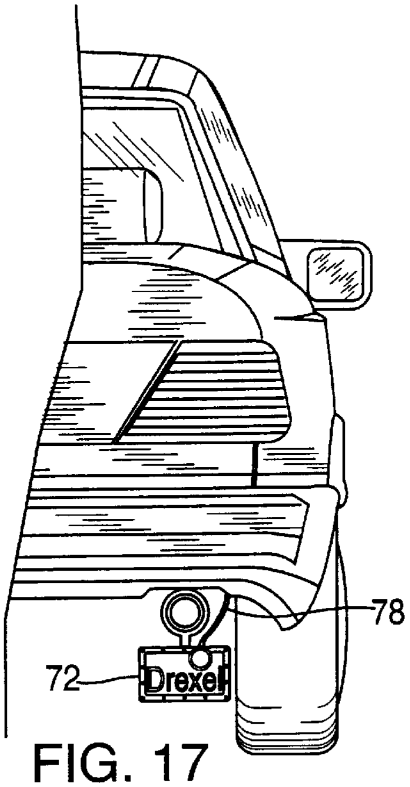

An illuminated embodiment is illustrated in FIGS. 15–17, where display article 72 has a section 70 including a plurality of lighting devices. These may be license plate light bulbs, or other lighting devices to illuminate the display article 72. A front view is illustrated in FIG. 15, where a university name is illuminated. The back view is illustrated in FIG. 16, having a plurality of connections to the lighting devices. Display article 72 receives electrical power from the electrical system of the automobile, and is coupled to this system by way of conductors 78. A switch 76 is provided to provide power to the lighting devices when the electrical connection is made. According to one embodiment, a battery 74 is also provided to reduce the drain on the vehicle's electrical system. The switch is then coupled to each of the lighting devices by way of electrical conductors. In one embodiment, a single light source is provided on the display article, and light is then passed to various points on the display article by way of fiber optic cable, or other means of transporting light. As illustrated in FIG. 17, conductors 78 are coupled to at least one tail light of the vehicle.

In one embodiment, conductors 78 are used to power a camera mounted on the display article. The camera provides video information back to the operator of the vehicle. This allows the operator to see obstructions behind the car. Here conductors 78 include bidirectional conductors which provide power to the camera and then relay information from the camera back to the operator. The operator may have a video display positioned within the vehicle. When the camera detects an obstacle, a signal is provided back to the operator. Such a signal may initiate an alarm or may cause the vehicle to come to a stop. The benefit of such a viewer when moving the vehicle in reverse is great.

Figure 18:
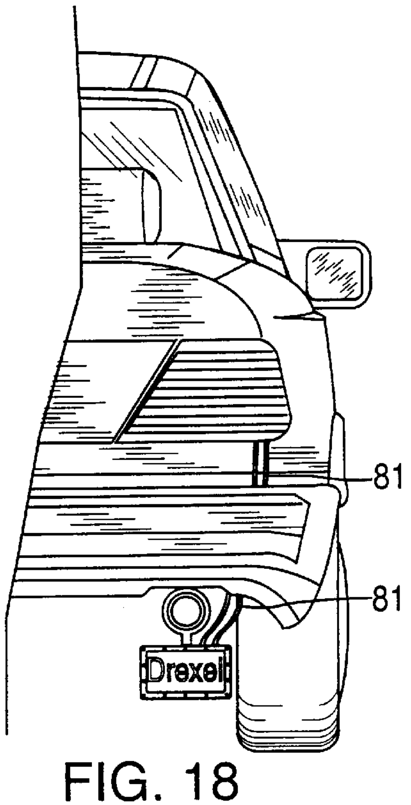
FIG. 18 illustrates a fiber optic display device according to one embodiment of the present invention.

According to one embodiment illustrated in FIG. 18, conductors 81 are fiber optic cables which direct light from the tail lights to the display article. No electrical circuitry is provided, but rather the fiber optic cables each go to positions, such as those illustrated in FIG. 18. In one embodiment, a small microcontroller is positioned on the back side of the display article to provide pulsing lights.

Figure 19:
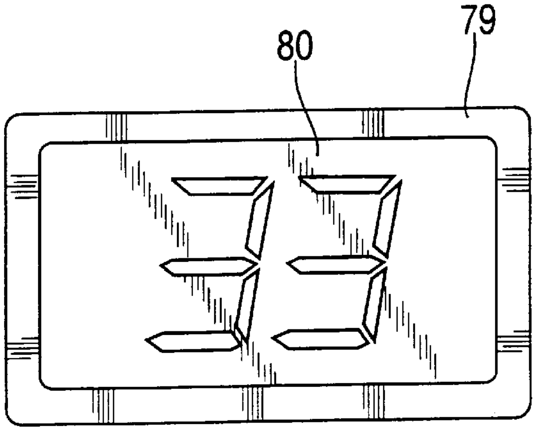
FIGS. 19 –20 illustrate a digital display device according to one embodiment of the present invention.
Figure 20:
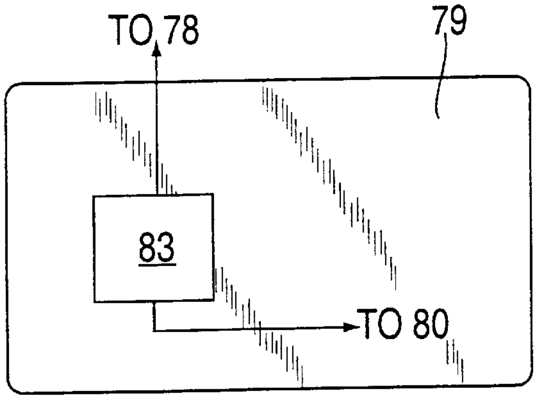

Still further embodiments incorporate other lighted displays, such as a liquid crystal diode (LCD) display, light emitting diode (LED), or other display, where the information is easily changed. As illustrated in FIG. 19, a display article 79 includes a lighted display portion 80, where the number "33" are displayed in a front view. A back view is illustrated in FIG. 20, where again electrical power is provided from the automotive system via conductors 78. Controller 83 is coupled to conductors 78 and to lighted display portion 80; controller 83 turns on when power is supplied to conductors 78 and turns off when power is terminated. The lighted display portion may provide a digital output, such as a ticker tape symbol, or message. Controller 83 includes a memory portion for storing the message(s) to be displayed. In one embodiment, a graphic image is displayed with requires additional memory, wherein the memory can be replaced to change the image. In this way, it is possible to display video information from the display article. Similarly, in one embodiment, a central controller is provided within the vehicle, allowing the operator to input a message to be displayed from the display article.

Although the display article illustrated in FIG. 1 is a square shape, similar to a small license plate, display articles may be any shape. For example, one display article illustrated in FIG. 14, is shaped like a football helmet. Within the scope of the present invention, any information that is displayed by way of bumper stickers, license plate frames, window stickers and decals, flags, antenna displays, etc. may be easily and effectively displayed using the display device. Further, the display device adds needed flexibility to the vehicle by providing a convenient place for chemical sensing of exhaust, provision of information regarding the rear of the vehicle, as well as providing a means for the operator to provide information to other vehicles.

Figure 21:
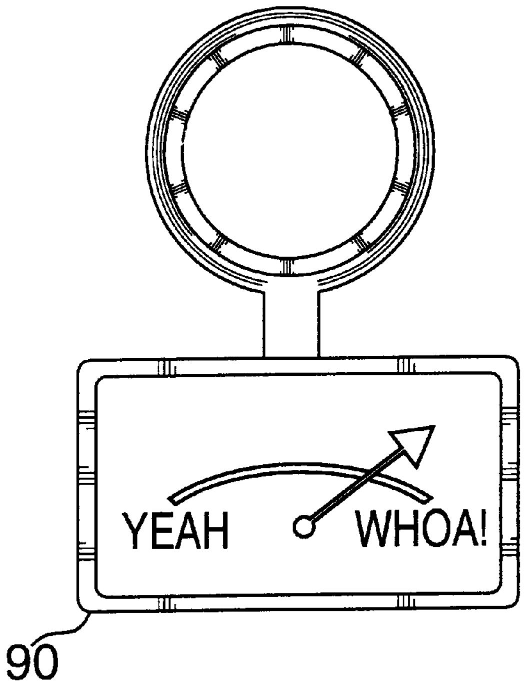
FIGS. 21–22 illustrate pollution detection display devices according to two embodiments of the present invention.
Figure 22:
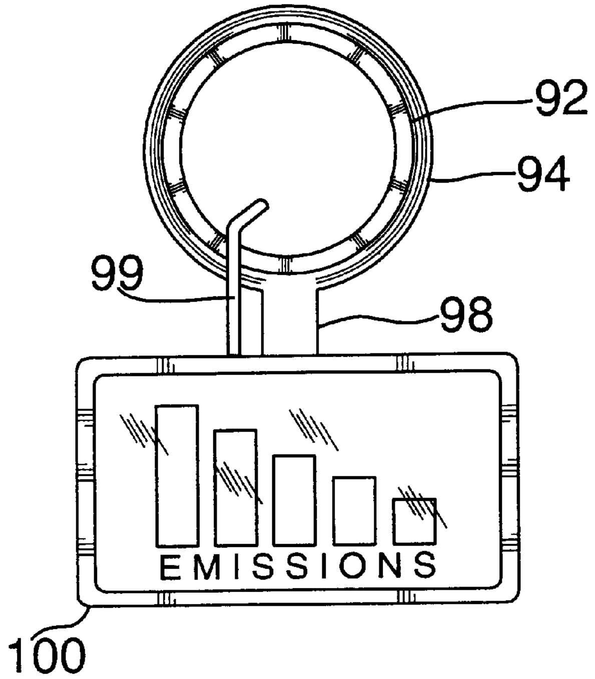

According to one embodiment of the present invention, the display article is composed of a material sensitive to vehicular emission chemistry, and provides an indication of the level of various components within the emission chemistry. For example, a material sensitive to pollutants indicates when pollutants are over a predetermined level. In one embodiment, this indication is to change color. In another embodiment, a gauge 90 is provided, as illustrated in FIG. 21, which provides a continuous emissions check. In still an alternate embodiment, illustrated in FIG. 22, display article 100 provides an indication of the emission chemistry of the vehicle, where a sensor 99 is coupled to display article 100. Sensor 99 is positioned is the path of a portion of the emission gases. As the gases pass the sensor, if the chemical content of the emission is above a predetermined threshold, a chemical reaction occurs causing the display article 100 to indicate the result.

Figure 23:
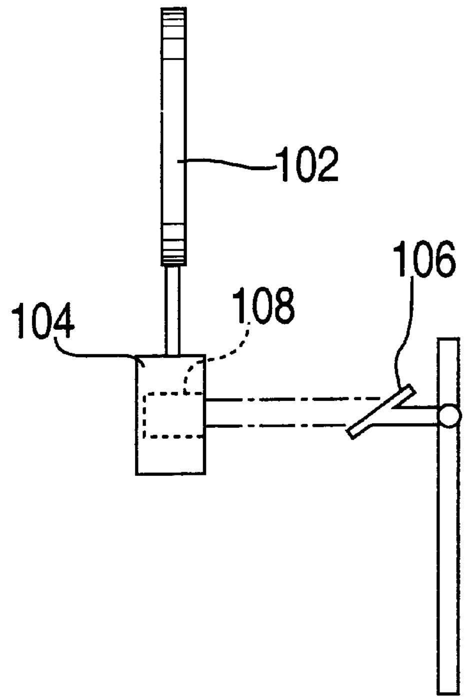
FIGS. 23–24 illustrate locking devices according to one embodiment of the present invention.
Figure 24:
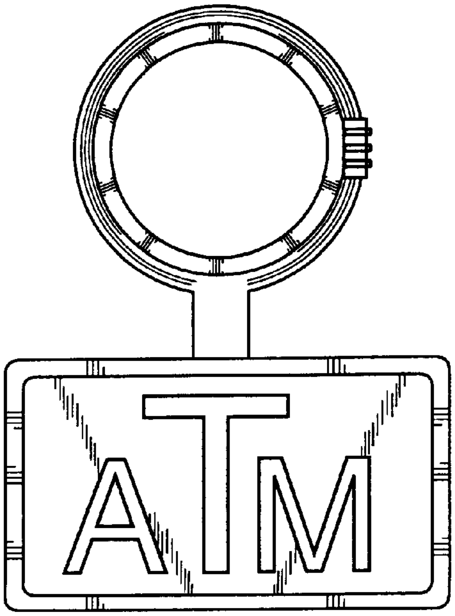

Various locking mechanisms are illustrated in FIGS. 23–24. Locking mechanisms may be implemented to secure the engagement means to the tailpipe, and/or may be implemented to secure the display article to the engagements means. One embodiment, illustrated in FIG. 23, provides a locking tab 106 on the display article, or on a coupling means. The locking tab 106 is mated to a slot 108 positioned on either the coupling means or the engagement means 102. The tab 106 fits into the slot 108 in one direction by compressing the locking tab 106 to fit within the slot 108. When fully inserted, the tab 106 is released and locks in place, thus securing the connection. The tab 106 is released by placing pressure on the tab 106 and removing the tab 106 from slot 108.

FIG. 24 illustrates a locking device positioned on the engagement means, which secures the engagement means to the tailpipe. This is particularly useful where the entire device is a single piece, as a molded plastic device. This lock may be any mechanism which secures the engagement means to the tailpipe, including the locking means discussed with respect to FIG. 23.

According to one embodiment, the display device is provided with a global positioning device receiver, which is easily mounted and located. In one embodiment, a global positioning system includes a plurality of check points. The checkpoints provide a control signal to activate the global positioning device on the display device. The checkpoints could be positioned at intersections and on major highways, as well as along rural stretches of road. The vehicle operator enables the device to determine a present location. Note that such checkpoints could be embedded in the roadway, and/or centerline, where each checkpoint provides coordinate information to the vehicle.

The display article may include a weather sensor which warns the operator of impending rain, or other condition based on atmospheric conditions. For example, a humidity indicator may be used to anticipate rain, and provide a signal to the operator to close windows, sunroofs, etc. The position of the display device below the vehicle allows protection from the elements and thus reduces the chance of mispredictions or other artifacts introduced into the sensor.

In one embodiment, a sensor placed on the display device is coupled to the alarm system of the vehicle, and provides added protection of the vehicle.

In one embodiment, prior to sale of a vehicle, the display device is used to hang a display article having a vehicle identification code, such as a bar code. The code provides information specific to the vehicle for that dealership. The device is easily attached by the dealership and is easily removed prior to sale, as it may be replaced by advertisement for the dealership. The position of the device protects the information from the elements. Particularly in large inventory vehicle dealers, it is possible to quickly read the codes passing the rear of each vehicle.

As the location in the rear of the vehicle on the exhaust system, the present invention provides a convenient method of providing tagging, identification, ticketing, etc., where a temporary display article is easily attached and easily removed. For example in a parking lot, tickets may be easily attached to each vehicle, either manually or by a device located in the driving surface. Here the car drives over a tread or other indicator and an appartus reaches up and attaches the display article to the tailpipe.

The present invention provides a means of easily presenting an advertisement message. In this way, an advertisement may be easily attached to the tailpipe. The message is detachable, and changeable with a simple coupling mechanism. It is further possible to apply a locking mechanism to any of these applications and thus prevent loss or fraud. In this way, an advertiser has access to the viewers of the display article without interfering with operation of the vehicle.

In one embodiment, a vehicle has multiple exhaust pipes with display devices according to the present invention attached to both. A visual display is presented between both, where for example a football player image on one sends a football to the other tailpipe. Other games and visual effects are possible within the scope of the present invention.

According to one embodiment, an extension goes onto the muffler for an aesthetic effect having a display device attached thereto. Wherein the display device is positioned with the positioning of the extension.

As discussed herein, there is an abundance of applications for the display device of the present invention.

Thus it is apparent that there has been provided, in accordance with the present invention, a display device, wherein the display device is for presenting a display from an exhaust pipe. Although the invention has been described and illustrated with reference to specific embodiments thereof, it is not intended that the invention be limited to these illustrative embodiments. Those skilled in the art will recognize that modifications and variations can be made without departing from the spirit of the invention. Therefore, it is intended that this invention encompass all such variations and modifications as fall within the scope as disclosed in the claims.

What is claimed is:

1. A method for display, comprising the steps of:

attaching a tailpipe attachment piece to an exhaust pipe of a vehicle the tailpipe attachment piece having a receiver piece; and providing a coupling means for coupling a display piece to the receiver piece such that the display piece is positioned approximately perpendicular to the length of the exhaust pipe.

2. The method of claim 1, further comprising attaching a display piece to the receiver piece via the coupling means.

3. The method of claim 2, further comprising the step of locking the display piece to the receiver piece.

4. A method for presenting an advertisement message, comprising the steps of:

positioning the advertisement message approximately perpendicular to an exhaust pipe of a vehicle; and coupling the advertisement message to a tailpipe attachment piece such that the advertisement piece is coupled to the exhaust pipe.

* * * * *